INVENTOR
Gustav Möhring
BY Lowry & Rinehart
ATTORNEY

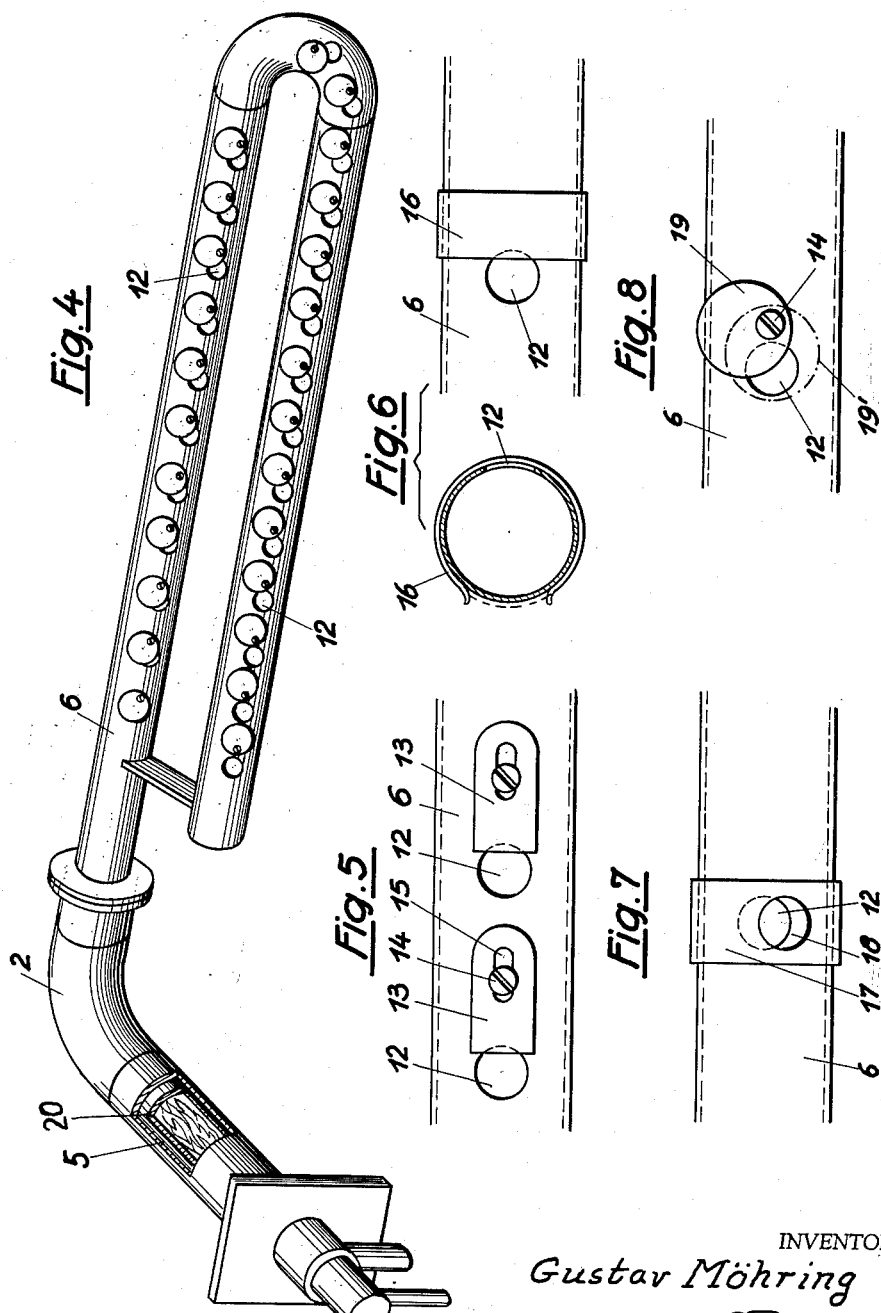

Aug. 13, 1963 G. MÖHRING 3,100,632
ARRANGEMENT FOR HEATING MACHINES FOR THE DRYING
AND HEAT TREATMENT OF TEXTILES AND THE LIKE
Filed May 11, 1960 3 Sheets-Sheet 3

INVENTOR.
Gustav Möhring
BY
Lowry & Rinehart
ATTYS.

United States Patent Office 3,100,632
Patented Aug. 13, 1963

3,100,632
ARRANGEMENT FOR HEATING MACHINES FOR THE DRYING AND HEAT TREATMENT OF TEXTILES AND THE LIKE
Gustav Möhring, Stuttgart, Germany, assignor to Famatex G.m.b.H., Stuttgart-Kornwestheim, Germany, a firm
Filed May 11, 1960, Ser. No. 28,277
Claims priority, application Germany May 16, 1959
9 Claims. (Cl. 263—19)

This invention relates to an arrangement for producing or feeding the heat necessary in machines for the drying and heat treatment of textiles and the like.

It is known in the art to fit in such machines heating elements fed with steam, hot water or electric current and to conduct the treating medium over these heating element.

It is also known in the art to install special gas or oil heated hot air generators separate from the drying and heat treatment machines and to directly or even indirectly heat the treatment medium by these and to conduct this medium to the machines through the intermediary of suitably arranged channels.

All of these heating plants are, however, open to the objection that more or less heat becomes lost through the conduits and in the heat exchange, which reduces the degree of efficiency of the drying and heat treatment machines. Another objection is present when the heating elements cannot be connected up with a local steam or hot water plant but special heat generators are necessary, for example the hot air generators already mentioned, which are generally very large assemblies.

To avoid these objections, it is proposed according to the invention to provide each drying or machine unit with at least one oil or gas burner arranged in the blower chamber thereof and equipped with a flame-tube and to feed air for combustion to said burner under pressure.

According to another feature of the invention the flame-tube is constructed in the form of a heating coil with one or more windings and the ends of which lead into the blower chamber or into a draft flue, according to the kind of fuel used.

This novel heating arrangement produces high heating efficiencies with small heating surface dimensions. The small heating surfaces in turn result in considerably smaller resistance to flow for the treatment medium so that in addition a general increase of efficiency of the machine is attained.

In the endeavour to enable this advantageous heating arrangement to be adapted as far as possible to the actual requirements which the heat treatment and machine construction have to comply with in order to produce the most favorable conditions, it is proposed according to the invention to provide the flame-tube with a number of apertures arranged locally or along the entire length of the wall and the cross-sectional passage areas of which apertures are adjustable as desired.

The novel construction of the flame-tube enables any desired distribution of heat over the drying field of the machine and, what is more important, also an absolutely uniform distribution of temperature to be maintained within the drying field which could hitherto only be attained to an insufficient extent because the flame-tube naturally has higher temperature near the burner nozzle than in its remaining portions.

Preferred embodiments of the invention will now be described by way of example and with reference to the accompanying drawings, in which:

FIG. 4 is a perspective view of the burner with a flame-tube having lateral passages or apertures;

FIG. 5 shows a flame-tube with passages or apertures closable by means of slides;

FIG. 6 is a modified form of construction of the flame-tube with a slidable ring closure for the apertures;

FIG. 7 shows another form of construction of the flame-tube with a shiftable ring for closing the apertures;

FIG. 8 shows a modification with swing cover plates for closing the apertures;

Figure 1:
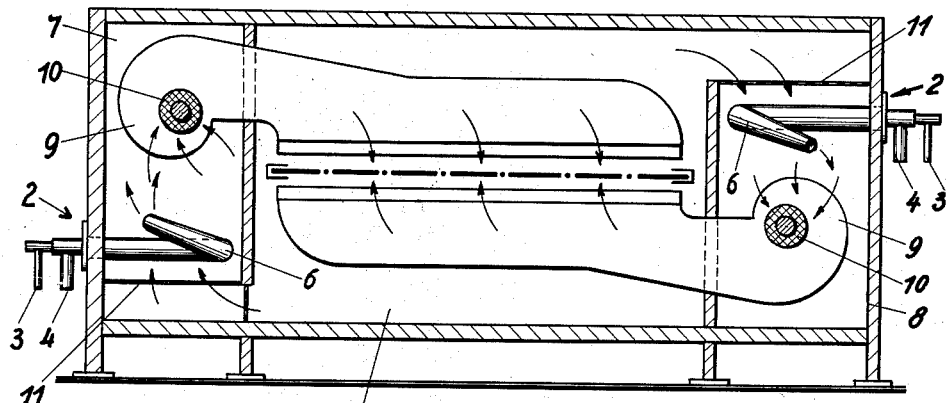
FIG. 1 shows in longitudinal section a machine unit with burners arranged in each of the blower chambers.
Figure 2:
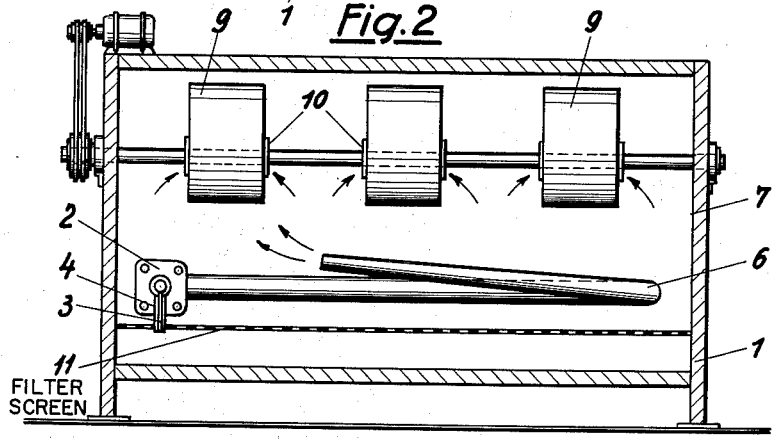
FIG. 2 is a cross-section through a blower chamber according to FIG. 1.
Figure 3:
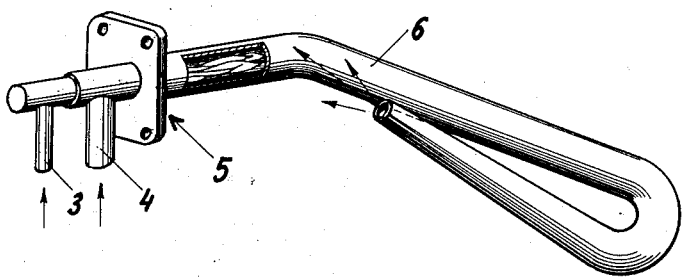
FIG. 3 shows on a larger scale a burner with flame-tube coil.

As shown in FIGS. 1 to 3, a burner 2 for fitting in a drying machine 1 consists of a burner nozzle 5 provided with gas and compressed air feeds 3 and 4 and on which a flame-tube 6 is fitted. In the proximity of the flame, the flame-tube 6 is provided with a protective sleeve 20, for example of asbestos, which serves to protect the flame-tube 6 against the radiation of heat. The flame-tube 6 is bent according to the installing conditions and rises in one or more windings so that it has the shape of a simple heating coil.

Such a burner 2 is fitted in each of two blower chambers 7 and 8 arranged one at each end of the machine 1 above or below blowers 9 according to the position thereof, but fundamentally so that the flame-tube 6 lies in front of its blower viewed in the direction of the suction current.

In the example illustrated a burner is provided for gas operation free from soot. In this case the open end of the flame-tube 6 terminates directly in the blower chamber so that the waste gases while still hot are mixed with the treatment medium, which naturally contributes to increasing the degree of efficiency of the machine. The flame-tube preferably ends directly in front of the suction apertures 10 of the blowers 9.

In cases where, due to the use of soot-producing fuels, for example heating oils, it is impossible to mix the waste gases with the treating medium, the end of the flame-tube 6 can be extended out of the blower chamber and into the draft flue.

So as to keep inflammable fibers away from the flame-tube, a narrow-meshed filter screen 11 is arranged in front of each flame-tube, which screen requires cleaning at intervals.

Any other oil or gas burner can be used to which the induction mixture or at least the air for combustion is fed.

The burner can also be provided with the usual safety devices. Thus for example with temperature feelers or thermostats which, in the event of overheating in the machine, shut off the burner, or with controlling devices which also shut off the burner in the case of the combustion mixture not having the correct composition. In addition the flame itself is preferably controlled by a photoelectric cell.

As shown in FIG. 4, the hair-pin-shaped flame-tube 6 of a gas or oil burner 2 according to the invention, may be provided with a series of wall apertures 12 which establish a connection between the interior of the flame-tube 6 and its surroundings. The apertures 12 in one modification may be adjustable in cross-section. For this purpose adjustable cover means in the form of small slide plates 13 are fitted adjacent the apertures 12 and fixable by means of screws 14, as shown in FIG. 5. The adjustment is rendered possible by a slot 15 provided in the plates 13.

Another form of construction is illustrated in FIG. 6. Here adjustable cover means in the form of a ring 16 capable of being slipped onto or shifted on the flame-tube 6 is used, which ring can be shifted in axial direction more or less over the aperture to which it is coordinated.

In FIG. 7 an adjustable cover means in the form of a cover ring 17 is illustrated which operates in a similar manner. It has an aperture 18 which can be brought more or less into register with the corresponding aperture 12 in the flame-tube 6 by turning the ring 17.

As shown in FIG. 8 the aperture can also be covered by means of an adjustable cover means in the form of a swing flap 19 which is fixed to pivot on the flame-tube 6 by means of a screw 14.

With the aid of these apertures which can be closed more or less, the distribution of the temperature in the drying field can be made very uniform. For this purpose the apertures 12 which are in the proximity of the burner, that is at the place where the highest temperatures occur in any case, are almost or entirely closed so that here only a small quantity of or even no heating gas can pass. The temperatures along the flame-tube decrease according to the distance from the burner. The drop in temperature is now equalized by the apertures 12 remaining wider open the farther they are situated from the burner and consequently more heating gases can pass out through these apertures and raise the temperature in this zone.

It is evident that any desired differences in temperature can also be produced in the drying field in this manner, according to the actual conditions.

In addition to or instead of the throttling or covering arrangements for the flame-tube apertures, other arrangements might easily be employed by means of which the apertures are made adjustable; also the arrangement of the apertures on the flame-tube may be different, for example the apertures might be arranged in two or more rows or mutually displaced. The flame-tube can likewise be provided with ribs between the adjustable apertures to still further increase the radiation of heat.

Figure 9:
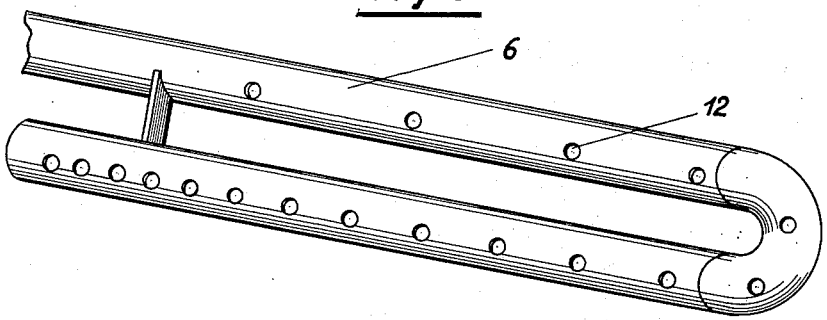
FIG. 9 is a fragmentary perspective view of a modification of the flame tube wherein the apertures are arranged at different distances apart according to the drop in temperature along the flame tube.
Figure 10:
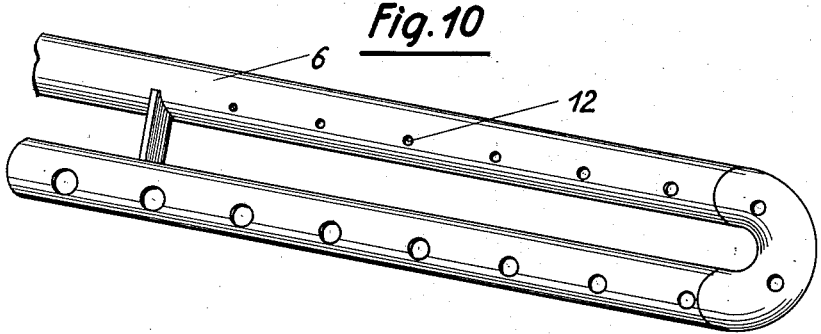
FIG. 10 is a fragmentary perspective view of a modification of the flame tube wherein the apertures are of different sizes according to the drop in temperature along the flame tube.

Finally it is mentioned that, if the temperature conditions are known beforehand, the distribution (FIG. 9) and diameter (FIG. 10) of the apertures can be fixed once and for all and then adjustment will no longer be necessary.

In the latter case the diameter of the passages generally increases with their distance from the burner nozzle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a drying and heat treatment machine for textiles and the like, a treatment chamber, a separate blower chamber adjacent to and communicating with said treatment chamber, blower means extending between said chambers including means for conducting hot gases from said blower chamber to said treatment chamber downstream of the communication between said chambers, at least one pressure-fed fuel burner within said blower chamber upstream of said blower means, said fuel burner having a burner jet nozzle with a flame tube adapted for fully enclosing the flame in said burner, said flame tube being in the form of a heating coil with at least one winding extending substantially transversely of the blower chamber upstream of said blower means.

2. The structure of claim 1 in which said treatment and blower chambers have a common wall therebetween, said blower means extending transversely through said common wall and including an inlet and outlet in the respective chambers, said blower chamber including a filter device upstream of said blower means inlet.

3. The structure as set forth in claim 2, wherein a heat insulating protective sleeve is placed within that portion of the flame tube enclosing the said burner jet nozzle, and extending along said tube for a distance necessary to adapt said sleeve to enclose said flame therein.

4. In a drying and heat treatment machine for textiles and the like, a treatment chamber, a blower chamber adjacent said treatment chamber, blower means conducting hot gases from said blower chamber to said treatment chamber, said blower chamber having therein at least one pressure-fed fluid fuel burner having a burner jet nozzle with a flame tube adapted for fully enclosing the flame of said burner, said flame tube being in the form of a heating coil with at least one winding extending transversely of said blower chamber, the wall of said flame tube being provided for at least a portion of its length with a plurality of apertures for the passage of combustion gases.

5. In a drying and heat treatment machine for textiles and the like, a treatment chamber, a blower chamber adjacent said treatment chamber, blower means conducting hot gases from said blower chamber to said treatment chamber, said blower chamber having therein at least one pressure-fed fluid fuel burner having a burner jet nozzle with a flame tube adapted for fully enclosing the flame of said burner, said flame tube being in the form of a heating coil with at least one winding extending transversely of said blower chamber, said apertures being of different size according to the temperature drop along the said flame tube.

6. In a drying and heat treatment machine for textiles and the like, a treatment chamber, a blower chamber adjacent said treatment chamber, blower means conducting hot gases from said blower chamber to said treatment chamber, said blower chamber having therein at least one pressure-fed fluid fuel burner having a burner jet nozzle with a flame tube adapted for fully enclosing the flame of said burner, said flame tube being in the form of a heating coil with at least one winding extending transversely of said blower chamber, the wall of said flame tube being provided for at least a portion of its length with a plurality of apertures for the passage of combustion gases, said wall apertures being adjustable in size.

7. In a drying and heat treatment machine for textiles and the like, a treatment chamber, a blower chamber adjacent said treatment chamber, blower means conducting hot gases from said blower chamber to said treatment chamber, said blower chamber having therein at least one pressure-fed fluid fuel burner having a burner jet nozzle with a flame tube adapted for fully enclosing the flame of said burner, said flame tube being in the form of a heating coil with at least one winding extending transversely of said blower chamber, the wall of said flame tube being provided for at least a portion of its length with a plurality of apertures for the passage of combustion gases, and each of said apertures being provided with an adjustable slide on the flame tube adjacent each aperture.

8. In a drying and heat treatment machine for textiles and the like, a treatment chamber, a blower chamber adjacent said treatment chamber, blower means conducting hot gases from said blower chamber to said treatment chamber, said blower chamber having therein at least one pressure-fed fluid fuel burner having a burner jet nozzle with a flame tube adapted for fully enclosing the flame of said burner, said flame tube being in the form of a heating coil with at least one winding extending transversely of said blower chamber, the wall of said flame tube being provided for at least a portion of its length with a plurality of apertures for the passage of combustion gases, and an adjustable flap on said flame tube adjacent each aperture to cover said aperture to the desired extent.

9. In a drying and heat treatment machine for textiles and the like, a treatment chamber, a blower chamber adjacent said treatment chamber, blower means conducting hot gases from said blower chamber to said treatment chamber, said blower chamber having therein at least one pressure-fed fluid fuel burner having a burner jet nozzle with a flame tube adapted for fully enclosing the flame of said burner, said flame tube being in the form of a heating coil with at least one winding extending transversely of said blower chamber, the wall of said flame tube being provided for at least a portion of its length with a plurality of apertures for the passage of combustion gases, and said apertures being arranged at different distances apart according to the drop in temperature along the flame tube.

References Cited in the file of this patent

UNITED STATES PATENTS

| | | |
|---|---|---|
| 591,966 | Halliwell | Oct. 19, 1897 |
| 738,186 | Halliwell | Sept. 8, 1903 |
| 1,719,684 | Besta | July 2, 1929 |
| 2,807,320 | Wildermann | Sept. 24, 1957 |
| 2,836,409 | Harrison | May 27, 1958 |
| 2,869,630 | Flynn | Jan. 20, 1959 |
| 2,903,051 | Blackman | Sept. 8, 1959 |
| 2,950,098 | Ruff | Aug. 23, 1960 |
| 2,999,676 | Ewing | Sept. 12, 1961 |

FOREIGN PATENTS

| | | |
|---|---|---|
| 12,327 | Austria | Feb. 15, 1903 |